(12) United States Patent
Imass Tariffi

(10) Patent No.: US 10,856,476 B2
(45) Date of Patent: Dec. 8, 2020

(54) ROBOTIC AGRICULTURAL IRRIGATION AND ANALYSIS SYSTEM

(71) Applicant: AgroMe Inc., Toronto (CA)

(72) Inventor: Alejandro Gustavo Imass Tariffi, Scarborough (CA)

(73) Assignee: AgroMe Inc., Toronto (CA)

( * ) Notice: Subject to any disclaimer, the term of this patent is extended or adjusted under 35 U.S.C. 154(b) by 0 days.

(21) Appl. No.: 16/386,537

(22) Filed: Apr. 17, 2019

(65) Prior Publication Data

US 2019/0320601 A1 Oct. 24, 2019

Related U.S. Application Data

(60) Provisional application No. 62/659,327, filed on Apr. 18, 2018.

(51) Int. Cl.
*A01G 25/16* (2006.01)
*A01C 23/04* (2006.01)
*A01B 79/00* (2006.01)

(52) U.S. Cl.
CPC .......... *A01G 25/167* (2013.01); *A01B 79/005* (2013.01); *A01C 23/042* (2013.01); *Y10T 137/189* (2015.04); *Y10T 137/1987* (2015.04); *Y10T 137/2012* (2015.04)

(58) Field of Classification Search
CPC ................ A01G 25/167; A01G 23/042; Y10T 137/189; Y10T 137/1939; Y10T 137/1963; Y10T 137/1987; Y10T 137/2012; A01B 79/005; A01C 23/042
USPC .......................... 137/78.3, 78.5, 79, 80, 81.1
See application file for complete search history.

(56) References Cited

U.S. PATENT DOCUMENTS

| | | | | |
|---|---|---|---|---|
| 3,844,305 A | * | 10/1974 | McCormick | A01G 25/167 137/78.3 |
| 4,015,366 A | * | 4/1977 | Hall, III | A01D 46/005 47/1.43 |
| 4,040,436 A | * | 8/1977 | Caldwell | A01G 25/167 137/78.3 |
| 4,197,866 A | * | 4/1980 | Neal | A01G 25/16 137/1 |

(Continued)

FOREIGN PATENT DOCUMENTS

CN 106258836 A 1/2017

OTHER PUBLICATIONS

Office Action dated Aug. 8, 2019 in Canadian Patent Application No. 3,040,523.

*Primary Examiner* — William M McCalister

(57) ABSTRACT

An agricultural irrigation control system including a pump, a dual port and on/off diverter in fluid communication with the pump, a multi-port diverter in fluid communication with the dual port and on/off diverter, a controller board in electronic communication with the dual port and on/off diverter and the multi-port diverter, the controller board controlling the operation of the dual port and on/off diverter and the multi-port diverter, and a plurality of environmental sensors in electronic communication with the controller board, where the agricultural irrigation control system is configured for individualized administration of one or more substances to one or more agricultural products based on real-time analysis of the one or more agricultural products and/or a surrounding environment of the one or more agricultural products provided by one or more environmental sensors of the plurality of environmental sensors.

19 Claims, 7 Drawing Sheets

(56) References Cited

U.S. PATENT DOCUMENTS

| | | | | |
|---|---|---|---|---|
| 4,396,149 A * | 8/1983 | Hirsch | A01G 25/16 | 239/63 |
| 4,545,396 A * | 10/1985 | Miller | A01G 25/16 | 137/78.3 |
| 4,848,389 A * | 7/1989 | Pirkle | E03B 7/10 | 137/80 |
| 5,060,859 A * | 10/1991 | Bancroft | A01G 25/167 | 239/64 |
| 5,746,240 A * | 5/1998 | Ayotte | B60S 3/00 | 137/240 |
| 6,036,104 A * | 3/2000 | Shih | A01G 25/02 | 137/78.3 |
| 6,453,215 B1 * | 9/2002 | Lavoie | A01G 25/16 | 137/624.11 |
| 7,172,366 B1 * | 2/2007 | Bishop, Jr. | E01C 13/02 | 137/78.3 |
| 7,562,832 B1 * | 7/2009 | Anderson | A01G 25/167 | 137/78.3 |
| 2005/0031416 A1 * | 2/2005 | Bishop, Jr. | A01B 45/02 | 405/37 |
| 2006/0027676 A1 * | 2/2006 | Buck | A01G 25/16 | 239/63 |
| 2006/0091245 A1 * | 5/2006 | Ivans | A01G 25/16 | 239/723 |
| 2007/0029401 A1 * | 2/2007 | Kaen | A01G 25/16 | 239/69 |
| 2007/0106426 A1 * | 5/2007 | Ensworth | G05B 19/18 | 700/284 |
| 2007/0237583 A1 * | 10/2007 | Corwon | E01C 13/02 | 405/37 |
| 2007/0277879 A1 * | 12/2007 | Anderson | A01G 25/16 | 137/78.3 |
| 2008/0097653 A1 * | 4/2008 | Kaprielian | A01C 23/042 | 700/284 |
| 2008/0119948 A1 * | 5/2008 | O'Connor | G05D 7/0664 | 700/9 |
| 2008/0302002 A1 * | 12/2008 | Schmidt | A01G 27/003 | 47/48.5 |
| 2008/0302882 A1 * | 12/2008 | Rosselli | A01G 25/00 | 239/1 |
| 2009/0293354 A1 * | 12/2009 | Goldberg | A01G 25/167 | 47/66.6 |
| 2010/0145530 A1 * | 6/2010 | Nickerson | A01G 25/167 | 700/284 |
| 2010/0222932 A1 * | 9/2010 | O'Connor | E03B 7/02 | 700/284 |
| 2010/0286833 A1 * | 11/2010 | Kaprielian | A01C 23/042 | 700/284 |
| 2014/0165713 A1 * | 6/2014 | Frey | G01N 33/24 | 73/64.56 |
| 2014/0361094 A1 * | 12/2014 | Michael | A01M 7/006 | 239/1 |
| 2015/0134129 A1 * | 5/2015 | Kidder | A01G 25/16 | 700/284 |

* cited by examiner

ROBOTIC AGRICULTURAL IRRIGATION AND ANALYSIS SYSTEM

CROSS-REFERENCE TO RELATED APPLICATIONS

The present application claims priority to U.S. Provisional Patent Application No. 62/659,327, filed Apr. 18, 2018, the disclosures and teachings of which are incorporated herein by reference.

TECHNICAL FIELD

The present invention relates to a robotic plant irrigation system based on the integration of microprocessors and/or microcontrollers, environmental sensors, Internet of Things (IoT) capabilities, artificial intelligence algorithms and techniques, and/or additive manufacturing, e.g., 3D printing.

BACKGROUND OF THE INVENTION

Climate change and rapidly depleting water resources, as well as the environmental damage caused by fertilizer run-offs, require re-thinking traditional farming methods and the application of modern technologies that can help reduce the environmental impact of open field farming while simultaneously enabling and augmenting other modes of agriculture, such as Controlled Environment Agriculture (CEA), to help offset the growing demand for better and more sustainable food.

Irrigation is a crucial aspect in any type of agricultural system, yet current irrigation systems have serious drawbacks and limitations, including the following: (a) All plants in the same area have the same irrigation schedule, and growers are usually limited to growing the same or similar species per unit of space, more or less at the same stage of growth; (b) Changing and/or adding specific nutrients or minerals to specific plants is mostly a manual task; (c) Most irrigation systems, even dripper systems, are wasteful since they cannot adjust the exact feed for each individual plant; (d) For effective water management (e.g., a typical residential grass lawn), it is currently difficult and/or costly to adjust irrigation based on the ever-changing needs of specific areas; and (e) Automatic soil or substrate analysis is a costly, tedious, and manual process. These are only a few examples of the problems and limitations of current irrigation technology.

There have been attempts to solve some of these issues through similar technologies, but to date they have not shown significant benefits in comparison to the added complexities and costs of the systems. See Dennis R. Pittenger, David A. Shaw, William E. Richie, June 2004, "EVALUATION OF WEATHER-SENSING LANDSCAPE IRRIGATION CONTROLLERS," study performed by University of California Cooperative Extension, Center for Landscape and Urban Horticulture. Hence, there is a need to simplify the technology in order to reduce initial capital investments and long term total cost of ownership, making individual plant irrigation and analysis an affordable reality for a diverse range of applications.

SUMMARY OF THE INVENTION

A robotic irrigation control system is disclosed based on the integration of microprocessors and/or microcontrollers, environmental sensors, Internet of Things (IoT) capabilities, artificial intelligence algorithms and techniques, and additive manufacturing (3D printing), among other elements. An important aspect of the present invention is an electronically controlled servo-driven liquid-reversible diverter that is capable of operating both as a liquid distributor (one to many) and as a mixer (many to one), coupled with a dual port and on/off diverter that is also reversible, and a wide variety of sensing devices to provide environmental feedback to the control system. These elements allow for the implementation of complex irrigation and/or analysis systems that can be used, e.g., in Controlled Environment Agriculture (CEA) and traditional Open Field Farming, including organic food production.

The system is controlled by microprocessor and/or microcontroller units which provide a plurality of settings that are configured to automatically adjust irrigation for optimization for a particular plant or area in a particular growth phase. The controller may also be configured to communicate and interoperate with external or aggregate systems using Internet of Things (IoT) capabilities for more complex and integrated control.

This technology would remove some of the limitations of traditional irrigation, including the following: (a) Growing different plants in the same space; (b) Growing plants at varying stages of development in the same space; (c) Administering specific water, feed, minerals, and other chemicals based on the individual needs of each plant; and (d) Performing automated robotic real-time analysis of soil or substrate components.

In general, in one aspect, the invention features an agricultural irrigation control system including a pump, a dual port and on/off diverter in fluid communication with the pump, a multi-port diverter in fluid communication with the dual port and on/off diverter, a controller board in electronic communication with the dual port and on/off diverter and the multi-port diverter, the controller board controlling the operation of the dual port and on/off diverter and the multi-port diverter, and a plurality of environmental sensors in electronic communication with the controller board, where the agricultural irrigation control system is configured for individualized administration of one or more substances to one or more agricultural products based on real-time analysis of the one or more agricultural products and/or a surrounding environment of the one or more agricultural products provided by one or more environmental sensors of the plurality of environmental sensors.

Implementations of the invention may include one or more of the following features. The dual port and on/off diverter and/or the multi-port diverter may be a servo motor-driven diverter. The dual port and on/off diverter and/or the multi-port diverter may be liquid-reversible. The dual port and on/off diverter may have a rack-and-pinion mechanism. The multi-port diverter may have 2 ports, 4 ports, 10 ports, or 12 ports. The multi-port diverter may have a rotary arrangement.

The plurality of environmental sensors may include one or more soil humidity level sensors. The plurality of environmental sensors may include one or more of an ambient temperature and humidity sensor, an electrical conductivity sensor, a pH level sensor, a carbon dioxide level sensor, and an infrared canopy temperature sensor. The system may further include a plurality of tanks in fluid communication with the multi-port diverter, and each tank in the plurality of tanks may include a different solution or an identical solution. The plurality of environmental sensors may include one or more of a tank level sensor, a tank solution temperature sensor, a tank solution pH level sensor, and a tank solution electrical conductivity sensor.

The system may further include a liquid analysis unit configured to analyze a slurry generated as a result of delivering water to the one or more agricultural products by the agricultural irrigation control system. The system may further include a quick disconnect coupler.

The controller board may be configured to communicate with one or more additional agricultural irrigation control systems through an Internet of Things (IoT) communication mechanism. The controller board may include a relay configured to directly or indirectly control the pump. The controller board may include or may be in electronic communication with a machine learning aspect for controlling the administration of the one or more substances to the one or more agricultural products based on the real-time analysis provided by the one or more environmental sensors. The one or more substances may be one or more of water, agricultural feed, minerals, nutrients, and agricultural chemicals.

DETAILED DESCRIPTION OF THE INVENTION

Figure 1:
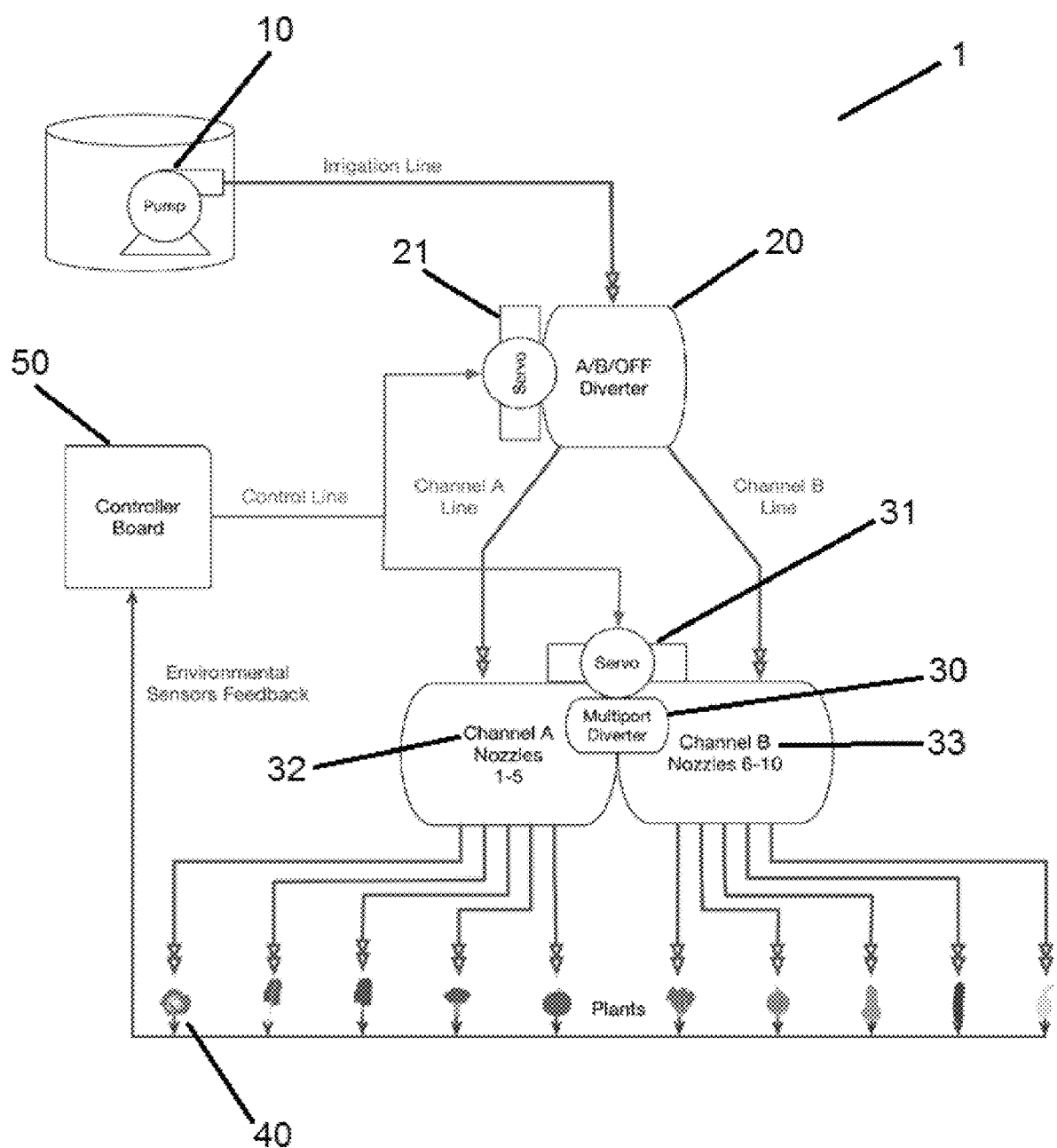
FIG. 1 shows a distributor configuration for a watering or feeding system according to one embodiment of the present invention.

FIG. 1 is a block diagram of a configuration 1 of the components for liquid distribution (one to many) according to one embodiment of the present invention. The distributor configuration may be connected to an existing irrigation system fed by an existing pump, such as pump 10. The distributor's controller board 50 may be equipped with a relay to control the pump or may send a signal to another system to activate the pump. The liquid is fed to A/B/OFF diverter 20 having servo motor 21, which is initially in the OFF position (i.e., acting as a valve so that no liquid can pass). The controller board 50 has a real-time clock that allows the system to set up schedule-based irrigation, and each plant 40 is configured individually or as a group. Accordingly, one or more schedules may be available.

Plants may also be irrigated based on soil humidity level. In this case, a soil humidity sensor will continually send the humidity level signal to the controller board, and this reading will be compared with the desired set-point programmed by the user. Intelligent and self-learning algorithms, such as those using artificial intelligence programming techniques, may irrigate incrementally and wait until readings stabilize before attempting to irrigate any further, thus preventing over-irrigation. Scheduled irrigation may be combined with sensor-based irrigation for any given plant with simple rules as to which should override the others.

Once the controller determines that a plant requires irrigation, it sends a signal to the multi-port diverter 30 having servo motor 31 to position over the specified nozzle. Once the multi-port diverter servo is positioned, the controller will send a signal to the A/B/OFF diverter to select the corresponding channel, e.g., Channel A and nozzles 32 or Channel B and nozzles 33. This combination of channel and nozzle connects an individual output nozzle to the input nozzle, and the liquid is diverted to an individual plant. Once the quantity of liquid has been delivered, the controller sends a signal to the A/B/OFF diverter so it becomes positioned in the OFF position and sets the multi-port diverter servo to a rest position. This process repeats throughout the day such that each plant is irrigated in a timely manner.

The present invention may include any industry-accepted diverter. Such a diverter may be a multi-port diverter having any acceptable number and arrangement of ports including, but not limited to, 2 ports, 4 ports, 10 ports, and 12 ports, and/or a rotary arrangement. An acceptable diverter may also have a rack-and-pinion design. The aforementioned aspects may be utilized together in combined application. Non-limiting examples of the present invention include usage of an A/B/C/D/OFF diverter and a 4-port or 8-port rotary diverter.

While a servo motor has been used in embodiments of the present disclosure, any industry-accepted motor may be used in the system of the present invention including, but not limited to, a direct current (DC) motor, which may have a separate gear mechanism. Moreover, a size of the nozzles used in embodiments of the present disclosure may be any industry-accepted nozzle size including, but not limited to, a ½-inch nozzle and a 1-inch nozzle.

The software uses special queuing logic to deal with overlaps in scheduling to prevent any plant from being skipped or over-irrigated. Additional environmental sensors may be added to the system, such as by means of an expansion unit, and these readings may be incorporated into the irrigation logic. For example, a general ambient temperature and humidity sensor may calculate the Vapor Pressure Deficit (VPD) of the environment and decide to adjust the irrigation on selected plants based on this value. The system may include other sensors including, but not limited to, those relating to electrical conductivity, pH, carbon dioxide levels, and infrared canopy temperature sensors, among others. Expansion modules may include light, humidity, and temperature control, among others.

Figure 2:
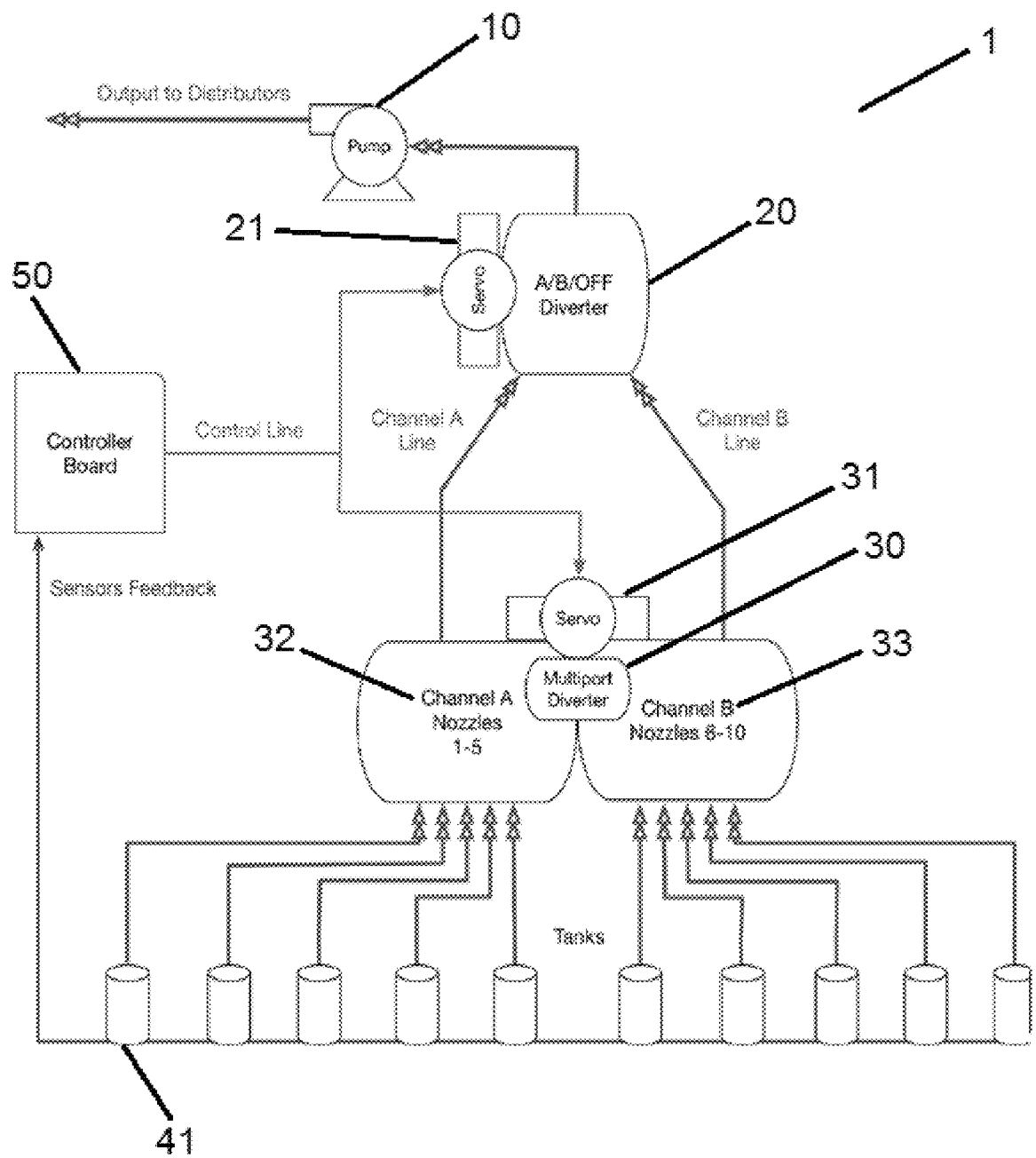
FIG. 2 shows a mixer configuration for a mixer system according to one embodiment of the present invention.

FIG. 2 is a block diagram of a configuration 1 of the components for a mixer application (many to one) according to one embodiment of the present invention. In this configuration, the setup is very similar to FIG. 1, except that the flow is reversed from one or more tanks 41 to the single output. The output can be, e.g., a mixing or holding tank, or directly connected to a distributor configuration, to create complex irrigation systems such as the system 300 illustrated in FIG. 3. Sensors may be added to the mixer configuration in order to further enhance the intelligence of the system. For example, sensors may be added relating to tank level readings as well as temperature, pH, and electrical conductivity of the solutions, and even input terminals by which an operator can input information regarding what the solution is in each tank.

Figure 3:
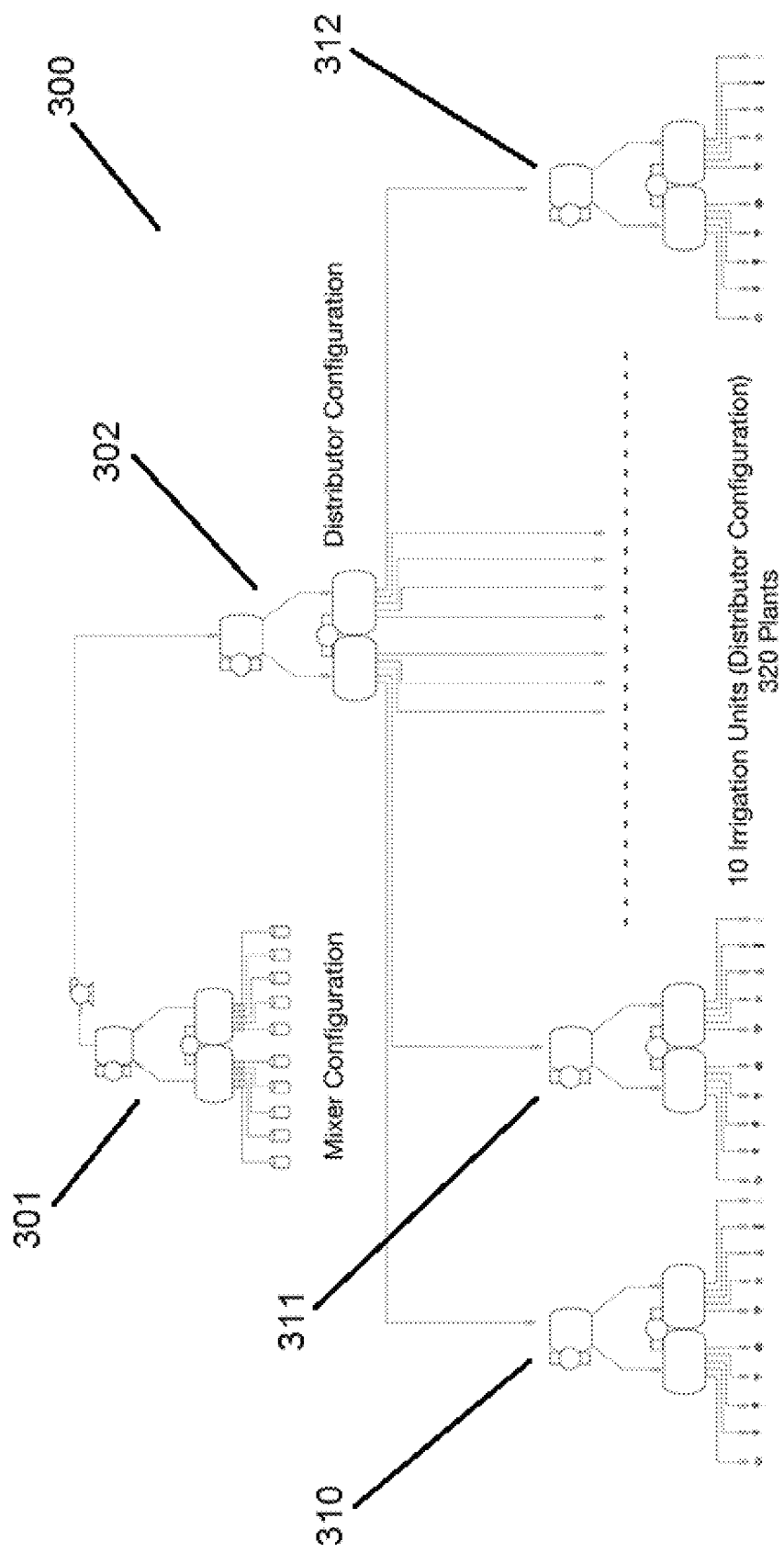
FIG. 3 shows a combined configuration for a mixer and feeding system according to one embodiment of the present invention.

FIG. 3 illustrates an example of a mixed configuration according to one embodiment of the present invention, specifically system 300, where 10 different solutions (one in each tank) can be fed to a group of 320 plants. Any of the configurations can be cascaded in such a way as to multiply the number of plants or the number of tanks. For example, beginning mixer 301 could feed middle distributor 302, which then could feed 10 similar distributors, including distributors 310, 311, and 312, which would feed 320 irrigation units, for a total of 3,200 plants. This allows for the creation of custom and complex irrigation systems having only a few units, something that would otherwise be cost prohibitive with pumps and solenoids. A key innovative feature of the multi-port and A/B/OFF diverters being separate units is that they can be used independently to create more intricate and optimized setups, e.g., two pumps feeding a single multi-port diverter, one on each channel.

Figure 4:
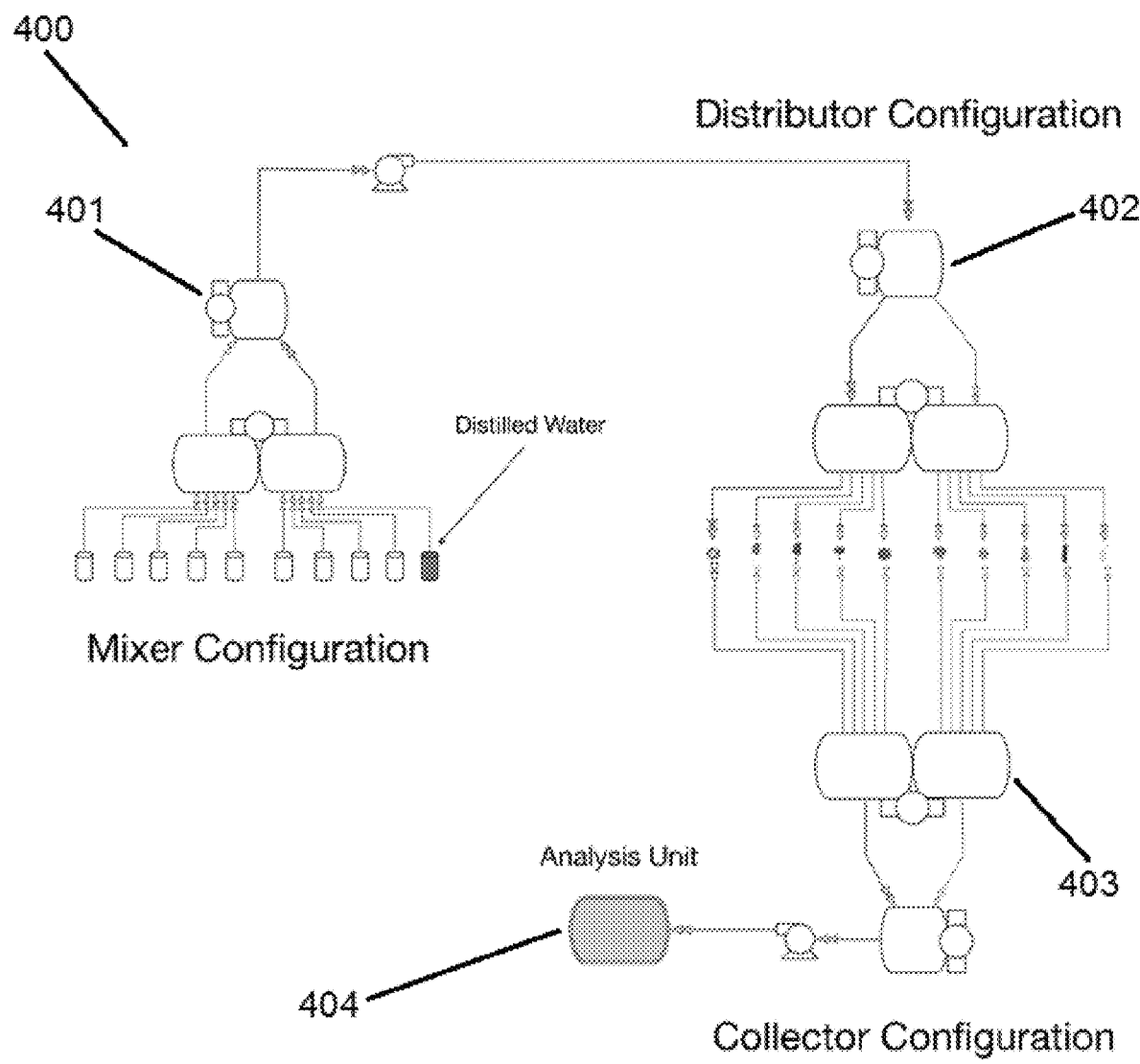
FIG. 4 shows a collector configuration for a substrate analysis robotic system according to one embodiment of the present invention.

FIG. 4 shows an example of a soil or substrate analysis system 400 according to one embodiment of the present invention, utilizing the well-known "Pour Through," or "PourThru," soil analysis method. System 400 combines the mixed configuration of FIG. 3, particularly beginning mixer 401 and middle distributor 402, with collector configuration 403 that also houses liquid analysis unit 404. One or more of the mixer tanks is dedicated to house distilled water, which can be used to deliver a specific amount of water to a specific plant, using a distributor configuration, e.g., as explained in previous embodiments. Slurry is collected at the bottom of the substrate, or below the roots in soil, and pulled by means of a diaphragm or similar suction-type pump. The slurry is then delivered to the coupled analysis unit, which can perform tests such as those relating to pH and electrical conductivity. An additional mixer configuration could be coupled to provide different chemical compounds, which may be required for more comprehensive analysis of the soil slurry sample.

Figure 5:
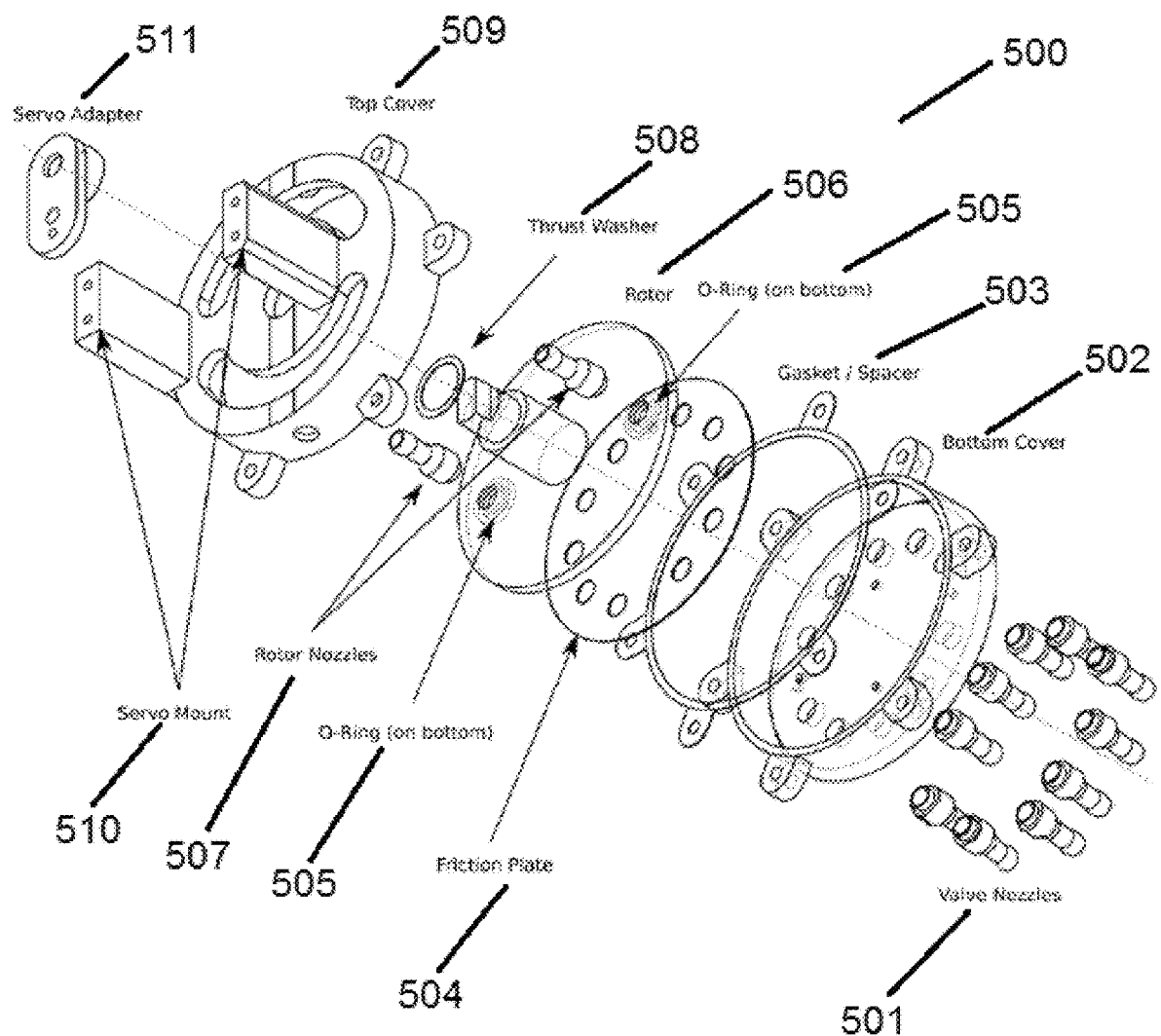
FIG. 5 shows an exploded view of a multi-port diverter according to one embodiment of the present invention.

FIG. 5 illustrates an exploded view of a multi-port diverter 500 according to one embodiment of the present invention. The bottom cover 502 holds 10 valve nozzles 501, which are grouped in two groups of five nozzles, diametrically opposed to each other. Each group works in conjunction with one of the rotor nozzles 507. Each group of five nozzles is preferably spread out in a radial pattern of 130 degrees, although this angle may vary in different embodiments. On the rotor, one nozzle is called channel A, and the other channel B. Having two independent sides (A and B) and the particular degrees of operation has many advantages, the most obvious being (a) less travel and wear on the o-rings 505 which, in turn, facilitates wear-reducing and wear-levelling algorithms, (b) maximizing the number of nozzles and the ability to use off-the-shelf servos, which efficiently and reliably operate around 160-180 degrees, and (c) flexibility of configurations and applications.

The rotor 506 has one o-ring 505 on the bottom side of each rotor nozzle 507. The pressure plate is a polished surface where the o-rings can slide with low friction to maximize the lifetime of both the o-rings and the friction plate 504. The thrust washer 508 and the gasket/spacer 503 are calibrated as to thickness such that the correct amount of pressure is applied on the o-rings and the pressure plate, creating the best seal with the least amount of friction possible. Other embodiments may add a calibrated spring in combination with the thrust washer or washers. A top cover 509 is disposed on top of the rotor 506, and may include one or more servo mounts 510. A servo adapter 511 is in contact with the rotor 506 through the top cover 509.

The diverter is fault-tolerant such that even if the o-rings are worn, fluid will flow out of the over-flow holes, which can be routed to a reservoir and a sensor and trigger a signal to indicate that corrective maintenance may be required on the diverter. The diverter is designed to continue to operate, even if the cycles have exceeded the lifespan of the o-rings and/or the friction plate and these components have started to fail. The system is designed for high reliability, maintainability, and fault tolerance.

One of the key innovations of the present invention is that the design is specifically engineered to accommodate both additive manufacturing, e.g., 3D printing, as well as more traditional injection molding. For example, the friction plate is engineered to be printed upside down on the 3D printer bed, providing a smooth surface that requires little or no post-processing. Leveraging additive manufacturing like 3D printing could allow users to print their own spare parts or even the complete equipment.

Figure 6:
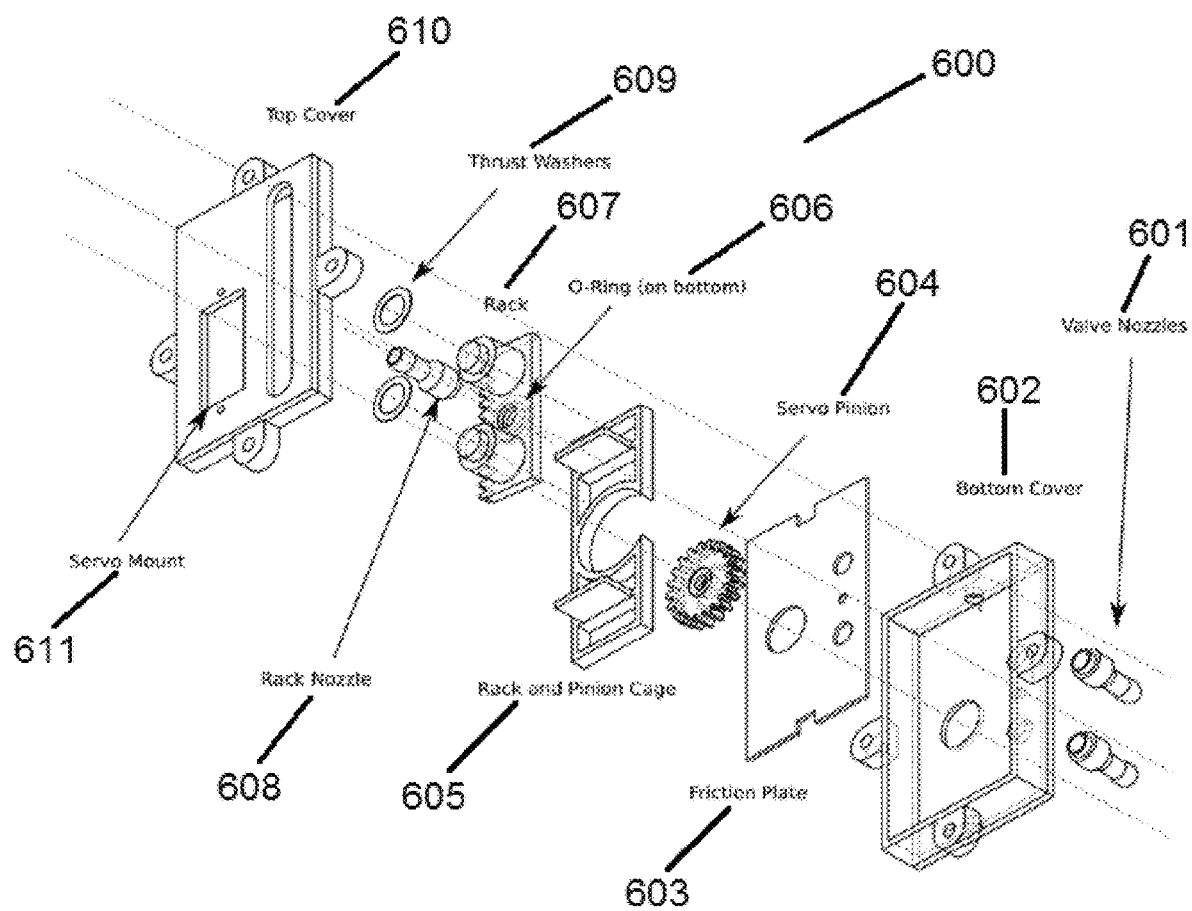
FIG. 6 shows an exploded view of an A/B/OFF diverter according to one embodiment of the present invention.

FIG. 6 illustrates an exploded view of an A/B/OFF diverter 600 according to one embodiment of the present invention. This diverter is based on a rack-and-pinion design, which allows more pressure to be put on the o-ring for a better seal on the OFF position. This allows the A/B/OFF diverter to be capable of replacing two solenoids in typical pressures of greenhouse irrigation, and reduce the need for the multi-port diverter to handle any high pressures. The bottom cover 602 holds two valve nozzles 601 and is in contact with a friction plate 603. A rack-and-pinion cage 605 with servo pinion 604 is in contact with the friction plate 603 as well. The rack 607 has one o-ring 606 on the bottom side of each rack nozzle 608, which is one rack nozzle in this embodiment. The thrust washers 609 are calibrated as to thickness such that the correct amount of pressure is applied on the o-ring 606 and the rack 607, creating the best seal with the least amount of friction possible. A top cover 610 is disposed on top of the rack 607, and may include a servo mount 611. Like with the multi-port diverter, the design is specifically engineered to accommodate both additive manufacturing, e.g., 3D printing, as well as more traditional injection molding.

Figure 7:
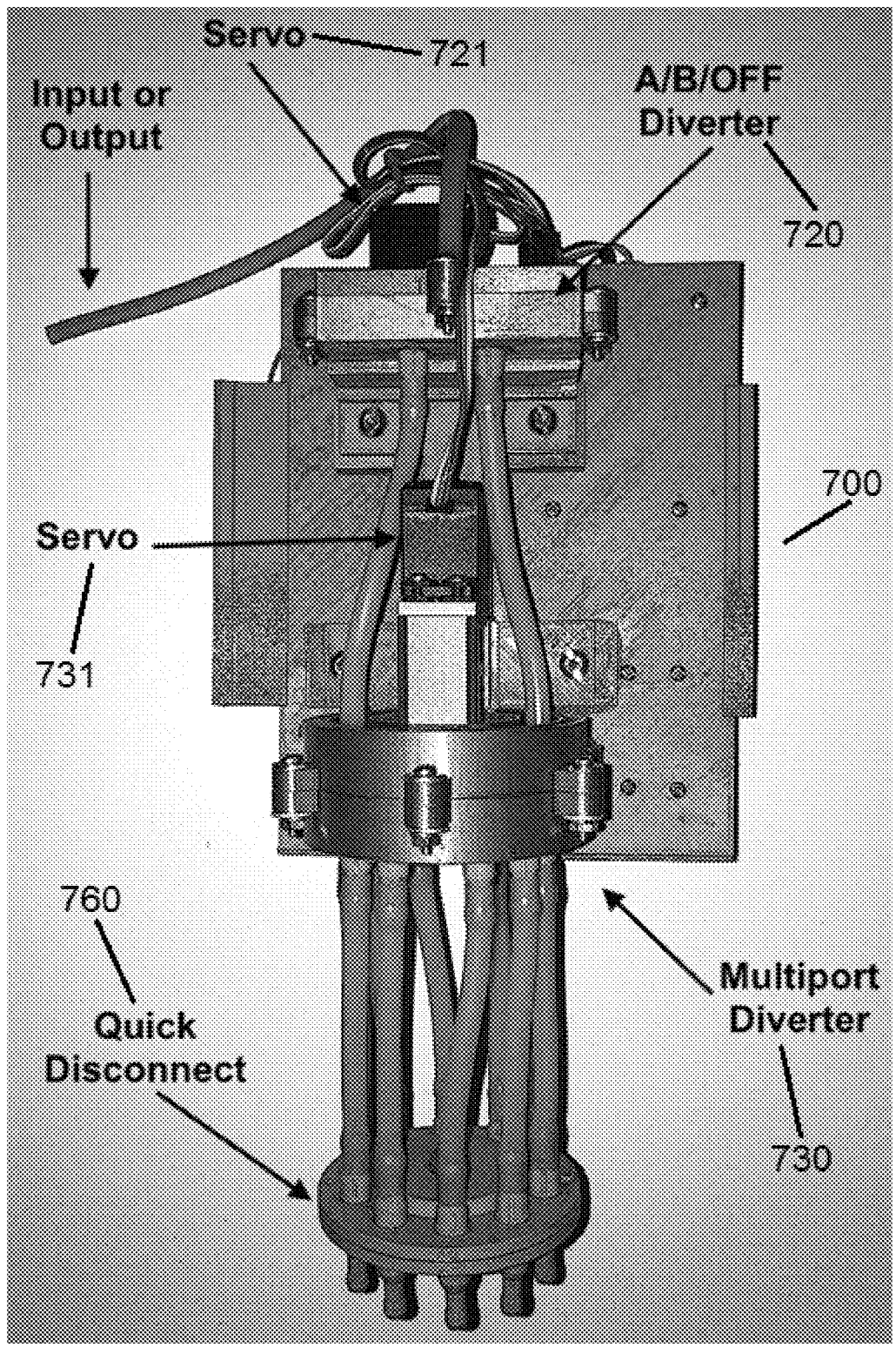
FIG. 7 shows an image of an assembled 10-port diverter kit according to one embodiment of the present invention.

FIG. 7 shows an image of an assembled 10-port diverter kit 700 having an A/B/OFF diverter 720 and a multi-port diverter 730. The physical assembly also includes an input/output, servo motors 721 and 731, and other accessories, such as the quick disconnect coupler 760 for repairs and maintenance.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the drawings and descriptive matter, in which there is illustrated a preferred embodiment of the invention.

What is claimed is:

1. An agricultural irrigation control system, comprising:
a pump;
a dual port and on/off diverter in fluid communication with the pump;
a multi-port diverter in fluid communication with the dual port and on/off diverter;
a controller board in electronic communication with the dual port and on/off diverter and the multi-port diverter, the controller board controlling the operation of the dual port and on/off diverter and the multi-port diverter; and
a plurality of environmental sensors in electronic communication with the controller board;
wherein the agricultural irrigation control system is configured for individualized administration of one or more substances to one or more agricultural products based on real-time analysis of the one or more agricultural products and/or a surrounding environment of the one or more agricultural products provided by one or more environmental sensors of the plurality of environmental sensors.

2. The agricultural irrigation control system of claim 1, wherein the dual port and on/off diverter is a servo motor-driven diverter.

3. The agricultural irrigation control system of claim 1, wherein the multi-port diverter is a servo motor-driven diverter.

4. The agricultural irrigation control system of claim 1, wherein the dual port and on/off diverter is liquid-reversible and wherein the multi-port diverter is liquid- reversible.

5. The agricultural irrigation control system of claim 1, wherein the dual port and on/off diverter has a rack-and-pinion mechanism.

6. The agricultural irrigation control system of claim 1, wherein the multi-port diverter has 2 ports, 4 ports, 10 ports, or 12 ports.

7. The agricultural irrigation control system of claim 1, wherein the multi-port diverter has a rotary arrangement.

8. The agricultural irrigation control system of claim 1, wherein the plurality of environmental sensors includes one or more soil humidity level sensors.

9. The agricultural irrigation control system of claim 1, wherein the plurality of environmental sensors includes one or more of an ambient temperature and humidity sensor, an electrical conductivity sensor, a pH level sensor, a carbon dioxide level sensor, and an infrared canopy temperature sensor.

10. The agricultural irrigation control system of claim 1, further comprising a plurality of tanks in fluid communication with the multi-port diverter.

11. The agricultural irrigation control system of claim 10, wherein each tank in the plurality of tanks includes a different solution.

12. The agricultural irrigation control system of claim 10, wherein each tank in the plurality of tanks includes an identical solution.

13. The agricultural irrigation control system of claim 10, wherein the plurality of environmental sensors includes one or more of a tank level sensor, a tank solution temperature sensor, a tank solution pH level sensor, and a tank solution electrical conductivity sensor.

14. The agricultural irrigation control system of claim 1, further comprising a liquid analysis unit configured to analyze a slurry generated as a result of delivering water to the one or more agricultural products by the agricultural irrigation control system.

15. The agricultural irrigation control system of claim 1, further comprising a quick disconnect coupler.

16. The agricultural irrigation control system of claim 1, wherein the controller board is configured to communicate with one or more additional agricultural irrigation control systems through an Internet of Things (IoT) communication mechanism.

17. The agricultural irrigation control system of claim 1, wherein the controller board includes a relay configured to directly or indirectly control the pump.

18. The agricultural irrigation control system of claim 1, wherein the controller board utilizes machine learning to control the administration of the one or more substances to the one or more agricultural products based on the real-time analysis provided by the one or more environmental sensors.

19. The agricultural irrigation control system of claim 1, wherein the one or more substances are one or more of water, agricultural feed, minerals, nutrients, and agricultural chemicals.

\* \* \* \* \*